(12) United States Patent
Fellman et al.

(10) Patent No.: US 7,551,647 B2
(45) Date of Patent: Jun. 23, 2009

(54) SYSTEM AND METHOD FOR CLOCK SYNCHRONIZATION OVER PACKET-SWITCHED NETWORKS

(75) Inventors: Ronald D. Fellman, San Diego, CA (US); John C. Beer, San Diego, CA (US)

(73) Assignee: Qvidium Technologies, Inc., San Diego, CA (US)

(*) Notice: Subject to any disclaimer, the term of this patent is extended or adjusted under 35 U.S.C. 154(b) by 699 days.

(21) Appl. No.: 11/184,486

(22) Filed: Jul. 19, 2005

(65) Prior Publication Data

US 2006/0013263 A1    Jan. 19, 2006

Related U.S. Application Data

(60) Provisional application No. 60/521,904, filed on Jul. 19, 2004.

(51) Int. Cl.
*H04L 12/28* (2006.01)
*H04J 3/06* (2006.01)

(52) U.S. Cl. .................................... 370/503
(58) Field of Classification Search ................ 370/503, 370/516
See application file for complete search history.

(56) References Cited

U.S. PATENT DOCUMENTS

| | | | |
|---|---|---|---|
| 6,449,291 B1 * | 9/2002 | Burns et al. | 370/516 |
| 6,751,228 B1 * | 6/2004 | Okamura | 370/412 |
| 2004/0141527 A1 * | 7/2004 | Bennett et al. | 370/503 |

* cited by examiner

*Primary Examiner*—Derrick W Ferris
*Assistant Examiner*—Angel Brockman
(74) *Attorney, Agent, or Firm*—Dalina Law Group P.C.

(57) ABSTRACT

Embodiments of the invention enable the synchronization of clocks across packet switched networks, such as the Internet, sufficient to drive a jitter buffer and other quality-of-service related buffering. Packet time stamps referenced to a local clock create a phase offset signal. A shortest-delay offset generator uses a moving-window filter to select the samples of the phase offset signal having the shortest network propagation delay within the window. This shortest network propagation delay filter minimizes the effect of network jitter under the assumption that queuing delays account for most of the network jitter. The addition of this filtered phase offset signal to a free-running local clock creates a time reference that is synchronized to the remote clock at the source thus allowing for the transport of audio, video, and other time-sensitive real-time signals with minimal latency.

20 Claims, 3 Drawing Sheets

SYSTEM AND METHOD FOR CLOCK SYNCHRONIZATION OVER PACKET-SWITCHED NETWORKS

This application takes priority from U.S. Application to Fellman entitled "METHOD FOR CLOCK SYNCHRONIZATION OVER PACKET-SWITCHED NETWORKS" filed Jul. 19, 2004, Ser. No. 60/521,904 is hereby incorporated herein by reference. U.S. Application to Fellman entitled "METHOD AND SYSTEM FOR PROVIDING SITE INDEPENDENT REAL-TIME VIDEO TRANSPORT OVER PACKET-SWITCHED NETWORKS" filed Jul. 7, 2004, Ser. No. 60/521,821 is hereby incorporated herein by reference. U.S. application to Fellman entitled "METHOD AND SYSTEM FOR PROVIDING SITE INDEPENDENT REAL-TIME MULTIMEDIA TRANSPORT OVER PACKET-SWITCHED NETWORKS" filed Jul. 7, 2005, Ser. No. 11/177,507 is hereby incorporated herein by reference.

BACKGROUND OF THE INVENTION

1. Field of the Invention

Embodiments of the invention relate generally to synchronizing clocks over packet switched networks, such as the Internet. More specifically, but not by way of limitation, embodiments of the invention relate to minimizing the effects of queuing delays on a transmitted timing signal.

2. Description of the Related Art

The advent of low-cost broadband Internet connections has created a demand for packet-switched networks, including the Internet itself, for the transport of audio, video, and other time-sensitive real-time signals. Systems that receive live or real-time signals over packet-switched networks, such as live audio and video streaming servers, video conferencing systems, or distributed real-time computing systems, require access to a local time clock that can maintain phase and frequency synchronization to the remote transmitter's clock. Such a synchronized local clock provides a reference against which a time stamp, either embedded within the real-time signal itself or stamped within an encapsulating packet, can determine an appropriate play-out time for an audio or video rendering engine at the receiver. However, the large queuing delays that arise in packet-switched networks, such as the Internet, induce significant packet timing jitter. Such jitter has traditionally been an impediment to live Internet streaming.

Traditionally, Internet streaming media applications employ large amounts of spooling, on the order of 10 seconds to over a minute, to handle Internet jitter. Unfortunately, live interactive audio and video applications require that end-to-end latency be under 500 milliseconds, and preferably less than 100 milliseconds. The reduction of latency to such low levels requires the use of precision clock synchronization. Precision clock synchronization enables the minimization of jitter queue size. The problem is that traditional clock recovery mechanisms for clock synchronization, such as phase-locked loops (PLLs), generally cannot handle such large Internet jitter levels.

The technical literature contains many references to phase and frequency locked loops and other clock recovery techniques for synchronizing a local clock to a remote clock with high precision and low jitter, provided that the jitter of the input signal does not exceed the design parameters of the clock recovery mechanism.

Unfortunately, congestion in packet-switched networks induces queuing delays that often add substantial jitter to these real-time signals. (We define jitter as the maximum variation in inter-packet arrival time.) The resulting jitter may impair the operation of standard clock recovery mechanisms and rendering engines. Consequently, standard real-time clock recovery mechanisms often do not work well when synchronizing to a timing signal transmitted across a packet-switched network, such as the Internet.

Buffering the input packet stream can eliminate jitter problems at the rendering engine. Buffering incoming packets with an input queue can eliminate network packet jitter, provided that the input queue is large enough to absorb all of the jitter, and that the packets are read out of the input queue at a constant rate that matches the average rate at which incoming packets are received. As long as this jitter removal queue neither overflows with packet loss, nor underflows to interrupt the smooth flow of data, then the rendering engine can function properly. However to prevent queue underflow or overflow, the use of such a de-jitter queue requires a synchronized local play-out clock that substantially tracks the frequency and phase of the remote clock generating the packetized data. Here again, jitter can impair the ability of a clock recovery mechanism to provide a synchronized clock for the jitter removal buffer.

One recent patent titled, "Minimizing the effect of jitter upon the quality of service operation of networked gateway devices" (U.S. Pat. No. 6,704,329, Martin, G.), claims a method to reduce the effects of network jitter that involves filtering a phase error by a minimum-delay filter to generate a control signal to control the frequency of a variable-frequency oscillator as part of a clock recovery mechanism. While this may produce a stable, low-jitter recovered clock from a high-jitter timing signal, it does not guarantee a low phase error. The slow response of a filtered control signal to adjust the frequency of a reference oscillator is generally a slow process that may allow significant phase drift in the reference clock. Furthermore, if the goal is to simply remove jitter so that a standard PLL can later recover the clock, then the additional step of generating a digital control signal is superfluous and adds implementation cost and complexity.

BRIEF SUMMARY OF THE INVENTION

An embodiment of the invention provides a simplified mechanism for synchronizing a local clock to a remote clock over a packet-switched network comprising significant packet jitter. A shortest-delay offset generator attenuates the effects of network jitter on transmitted timing data to allow the adaptation of standard clock recovery and jitter removal mechanisms, and facilitates the replacement of more traditional circuit-switched communications with packet-switched transport and Internet links. The synchronization of a local timing reference to a remote clock facilitates the use of a de-jitter queue and other such buffer mechanisms to provide basic quality of service filtering, such as jitter removal, packet reordering, and error correction, to improve the ability of a packet-switched network to handle live time-sensitive signal streams.

In one application of the invention, the simple addition of the jitter-filtered phase offset to a local free-running clock provides a clock adequate to drive quality-of-service (QoS) packet processing buffers, including queues for jitter removal, restoring packet order, and error correction. By constraining a phase offset adjustment so that it does not change too quickly, this clock recovery mechanism can provide a clock in applications that need higher resolution, such as video and audio playback.

DETAILED DESCRIPTION OF THE INVENTION

Figure 1:
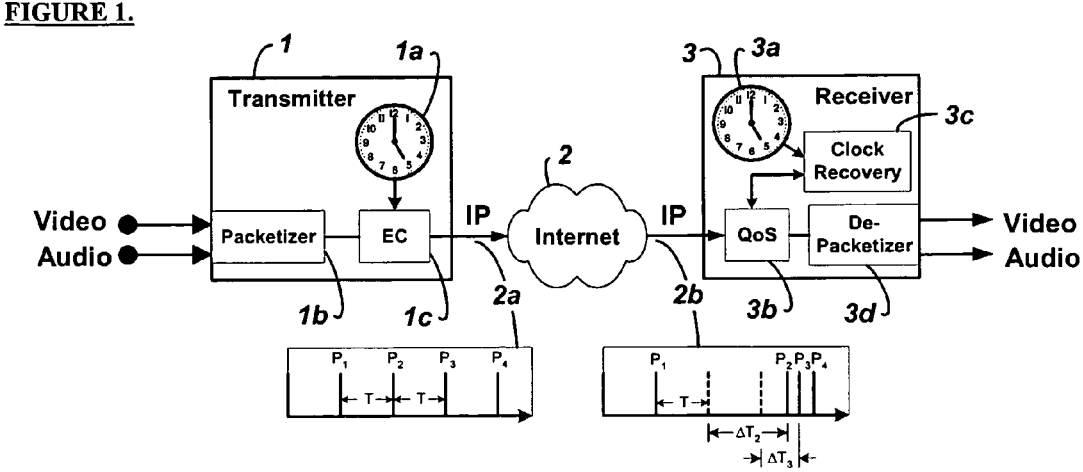
FIG. 1. A system diagram showing one embodiment of the invention wherein a transmitting node connects via the Internet to a receiving node. A local source clock in the transmitting node timestamps outgoing packets. Jitter in the network randomly delays some packets. A clock recovery mechanism in the receiving node combines a local clock with packet timestamps to generate a synchronized clock.
Figure 2:
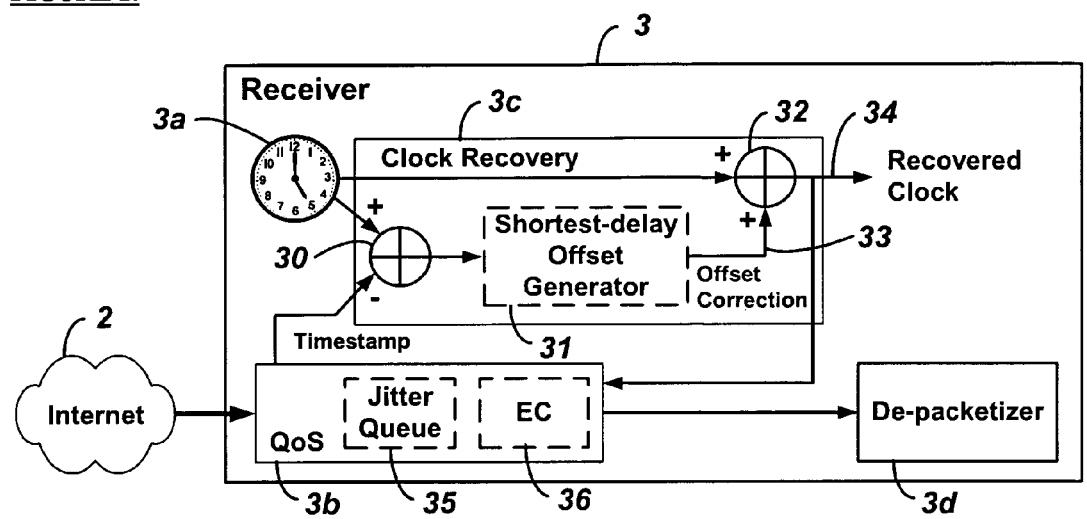
FIG. 2. Block diagram of one embodiment of a clock recovery mechanism of the invention interacting with quality of service (QoS) mechanisms within a receiving node.

FIG. 1 shows an embodiment of the invention that provides a simplified mechanism for synchronizing a local clock $3a$ in a receiver to a remote clock $1a$ at a transmitter over a packet-switched network 2 comprising significant network packet jitter. FIG. 2 provides more detail for an embodiment of a clock recovery mechanism $3c$ and quality of service (QoS) mechanisms $3b$. In this embodiment, the clock recovery mechanism $3c$ uses a shortest-delay offset generator 31 to attenuate the effects of network jitter on transmitted timing data to allow the effective implementation of quality of service mechanisms $3b$ and standard clock recovery techniques. An effective implementation of QoS mechanisms $3b$ can mitigate the adverse effects of packet-switched communications networks and thereby facilitate the replacement of more traditional circuit-switched communications with packet-switched transport and Internet links. Effective synchronization of a local timing reference $3c$ to a remote clock $1a$ also facilitates the use of a de-jitter queue 35, error correction mechanisms 36, and other such QoS mechanisms to provide basic quality of service filtering, such as jitter removal, packet reordering, and error correction, to improve the ability of a packet-switched network to handle live time-sensitive signal streams.

In order to understand how a shortest-delay offset generator can provide an efficient mechanism for jitter filtering, we model the end-to-end network transport delay as the sum of a constant propagation delay plus a variable queuing delay. The constant propagation delay comprises the sum of the speed-of-light propagation delay of the individual links plus the (approximately constant, unqueued) processing time at each node. This constant propagation delay factor excludes any queuing effects and thereby represents the minimum propagation delay through the network.

Queuing delay at each node adds a variable amount of delay to this minimum propagation time. Thus for an unloaded network, a packet will not experience any queuing delays as it propagates from the source to its destination. Such packets will arrive at the destination after traveling through the network for the minimum propagation delay time. We define the fundamental network propagation delay as the propagation delay time for a packet that travels from source to destination without encountering any queuing delay.

As the loading on this network increases, packets begin to experience varying amounts of queuing delay. In a lightly loaded network most packets will not experience any queuing delay. Furthermore we will assume that as long as the network does not overload, such that the sum of the arrival rate of all packets entering a node, and bound for a particular egress link, does not exceed the link rate of their egress link, nor exceed the packet processing rate of the node itself, then a significant percentage of packets will not experience any queuing delays. Further assuming equal priority for all packets entering a node in this case, those packets that do experience delays will generally only wait, at most, a single packet transmit time per queue at each node where they might be delayed. Restating this observation another way: if the probability for a packet to encounter queuing delay at any given node is less than one, then the probability of a packet being delayed at multiple nodes decreases exponentially as the number of nodes of delay increases.

Timing diagrams $2a$ and $2b$ in FIG. 1 show the effect of queuing-induced jitter on packets carrying timing information. Timing diagram $2a$ shows how four packets, $P_1$ through $P_4$, enter the network without jitter. In other words, they each have a constant delay T between them. Upon emerging from the network, timing diagram $2b$ shows packet $P_2$ having incurred an additional delay of $\Delta T_2$ and packet $P_3$ incurring an additional $\Delta T_3$ of delay. As a result of this network jitter, three of these timing packets, $P_2$ through $P_4$, arrive at the receiver in a burst.

The mechanism for clock recovery $3c$ of one embodiment of the invention comprises determining the constant fundamental propagation delay of the network and using this delay as a constant phase offset 33 to a local reference clock $3a$ having nearly the same frequency as the source clock $1a$. Because the probability distribution of incoming packets favors those packets with smaller delays, and because the propagation time for packets with the shortest delay most closely matches the constant network propagation delay, we can use the delay time of packets with the shortest delay as an estimate of the fundamental network propagation delay. Thus, delay times for packets filtered by a shortest-delay offset generator 31 can be used to estimate the phase offset 33 for local clock recovery.

Figure 3:
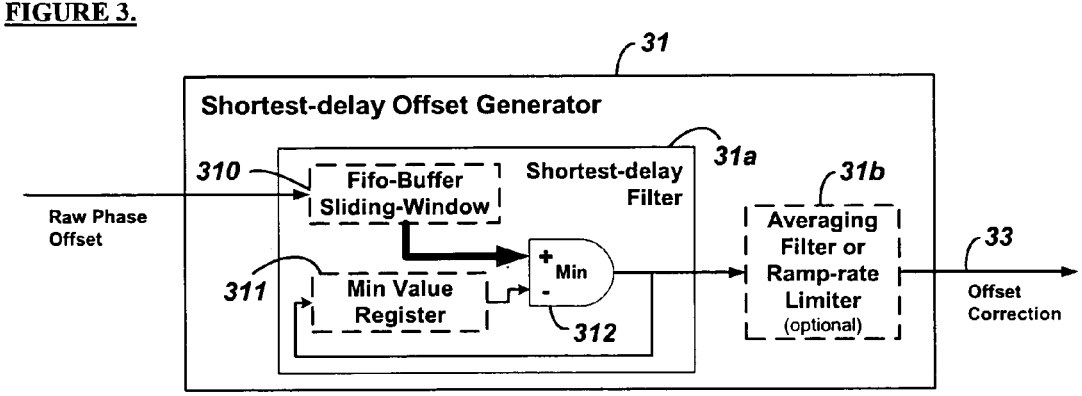
FIG. 3. Block diagram of one embodiment of a shortest-delay offset generator of the invention showing sliding-window shortest-delay filter implemented using a first-in-first-out (FIFO) buffer, and optional post-processing to limit rate-of-change in offset output.

One embodiment of the shortest-delay offset generator 31 takes the difference 30 between the local clock $3a$ time and the incoming packet timestamp to generate raw phase offset values. FIG. 3 shows one embodiment of the shortest-delay offset generator in more detail. The raw phase offsets sequentially enter a sliding window buffer 310 of a shortest-delay filter mechanism $31a$. A comparator 312 determines the minimum value among all values in the sliding-window 310 and stores this minimum value in memory or a register 311. In one embodiment of the invention, the minimum value is found by means of a linear search. The shortest-delay filter $31a$ outputs said minimum value, where it can be either used directly to produce filtered offset correction 33 or it can be fed to an averaging filter or to a ramp-rate limiter to constrain the rate of offset adjustment to smooth out residual jitter variations. If $31b$ is used, then the output of $31b$ produces a filtered offset correction 33.

Another embodiment of the minimum value generator 312 feeds the values of the sliding window buffer 310 to create a balanced binary tree within 312, where the tree node's contents are an offset and a reference counter. Balanced binary trees are well known in the art. One reference that teaches their implementation is: "Art of Computer Programming, Volume 3: Sorting and Searching, 2nd Edition" by Donald E. Knuth (ISBN: 0201896850, Publisher: Addison Wesley Professional). (We shall consider a balanced binary tree as having N nodes and $Log_2 N$ levels.) Because the distribution of queuing delay across a network 2 generally follows a Poisson or Exponential distribution, N can be much smaller than the number of offsets in the sliding window buffer. As a result, a sliding-tree embodiment of 312 for finding the minimum among the values stored in the sliding window 310 can be faster and more efficient than a linear search embodiment of 312.

For example, if the sliding window size is 100 and the number of nodes in the tree is 16, a linear search requires 100 comparisons whereas a tree search would require only traversing 4 nodes (a balanced binary tree has $\log_2 N$ levels where N is the number of nodes in the tree). When offsets are inserted into the sliding window 310 they are also inserted into the tree in 312 and when offsets are deleted from the sliding window 310 they are also deleted from the tree in 312. When an offset is inserted into the tree in 312 for the first time, a new node is inserted into the tree and the reference count is 1. The insertion of each subsequent offset increments the reference count for a node having the same offset. When offsets are deleted the reference count is decremented. And, when the reference count becomes zero the node is deleted from the tree.

In a basic application of the invention, the simple addition 32 of the jitter-filtered phase offset 33 to a local free-running clock 3a provides a clock adequate to drive quality-of-service (QoS) packet processing buffers 3b, including queue 35 for jitter removal and restoring packet order, and error correction mechanism 36. By constraining a phase offset adjustment so that it does not change too quickly, this simple clock recovery mechanism can provide a clock in applications that need higher resolution, such as video and audio playback.

Embodiments of the invention utilized in QoS applications excel in environments comprising: 1) the frequency variation among local free-running time references 1a and 3a at multiple similar nodes across a network is relatively small; 2) the primary cause of network-induced jitter is packet queuing delay; and 3) the distribution of queuing delay across a network 2 generally follows a Poisson or Exponential distribution and therefore giving rise to the highest probability occurring when a packet experiences minimal queuing delays.

The clock synchronization mechanism 3c of the present invention adds a filtered phase offset 33, at regular time intervals, to a free-running local oscillator 3a to continuously align the phase of the local recovered clock 34 to that of a remote clock 1a. Directly adding the filtered phase offset 33 to a free-running clock 3a, rather than generating a control signal to indirectly adjust a clock's frequency, insures close phase alignment of the local clock reference and simplifies implementation.

The addition 32 of a filtered phase offset 33 to a local clock 3a at regular, but not necessarily periodic, time intervals creates a time reference at a receiver that continuously adjusts clock drift so that it also maintains substantial frequency synchronization to the remote clock of a transmitter communicating over a packet-switched network. If the local free-running clock 3a can be assumed to run at substantially the same clock frequency as the remote clock 1a at an audio/video source node, then the phase drift due to any mismatch between the local and remote clocks that might accumulate between successive phase adjustments is negligible.

As compared with other approaches that generate a control signal to control a variable-frequency oscillator, this embodiment has the advantages of quickly adjusting to phase errors, of not requiring the implementation or control of a variable-frequency oscillator, and quickly adapting to and eliminating phase drift errors in the recovered clock 34. Although the recovered clock 34 may exhibit larger jitter than approaches involving a control signal and a variable-frequency oscillator, however provided that jitter filter 31 includes a large enough window of data, our measurements show that the resulting jitter in recovered clock 34, over a wide range of typical Internet connections, is small enough such that subsequent standard clock recovery processing can effectively recover a stable clock.

The invention claimed is:

1. A system for clock synchronization over packet-switched networks comprising:
   a network;
   a first node selected from a group of nodes wherein said first node is coupled with said network and wherein said first node comprises:
   a packetizer;
   a time clock to time stamp a first packet and a second packet;
   a plurality of second nodes selected from said group of nodes wherein said plurality of second nodes are coupled with said network and wherein said plurality of second nodes comprises:
   a receiver time clock;
   a quality of service module comprising a de-jitter queue;
   a clock recovery module coupled with said receiver time clock and said quality of service module and wherein said clock recovery module is used to generate a first difference between a first packet timestamp taken from said first packet and said receiver time clock and a second difference between a second packet timestamp taken from said second packet and said receiver time clock;
   said clock recovery module further comprising a shortest-delay offset generator;
   said shortest-delay offset generator comprising a fifo-buffer sliding window for holding said first difference and said second difference and a comparator and wherein said shortest-delay offset generator calculates an offset correction estimation of a fundamental network propagation delay using said first difference and said second difference;
   said clock recovery module configured to generate a recovered clock value from said receiver time clock and said offset correction estimation; and,
   said first node configured to transmit to said plurality of said second nodes.

2. The system of claim 1 wherein said error correction module comprises an automatic repeat request module.

3. The system of claim 1 wherein said error correction module comprises a forward error correction module.

4. The system of claim 1 wherein said error correction module comprises an automatic repeat request module and a forward error correction module.

5. The system of claim 1 said comparator comprises a linear array.

6. The system of claim 1 further comprising an averaging filter coupled with a comparator output.

7. The system of claim 1 further comprising a ramp-rate limiter coupled with a comparator output.

8. The system of claim 1 wherein said first node comprises a network enabled computing device.

9. The system of claim 8 wherein said network enabled computing device comprises a real-time video conference server or video streaming server or live video streaming server.

10. The system of claim 8 wherein said network enabled computing device comprises a laptop, a personal computer, a personal digital assistant or a cell phone.

11. A method for clock synchronization over packet-switched networks comprising:
  packetizing data into a first packet in a first node selected from a group of nodes wherein said first node is coupled with a network;
  packetizing data into a second packet in said first node;
  time stamping said first packet in said first node;
  time stamping said second packet in said first node;
  transmitting said first packet and said second packet over said network;
  providing software to a plurality of second nodes selected from said group of nodes wherein said plurality of second nodes are coupled with said network and wherein said plurality of second nodes are configured to generate a shortest delay offset wherein said software comprises the steps of:
  recovering a clock by generating a first difference between a first packet timestamp taken from said first packet and a receiver time clock and a second difference between a second packet timestamp taken from said second packet and said receiver time clock;
  said recovering said clock comprising utilizing a quality of service module comprising a dejitter queue;
  said recovering said clock comprising utilizing a shortest-delay offset generator comprising a fifo-buffer sliding window for holding said first difference and said second difference and a comparator;
  said shortest-delay offset generator utilized in calculating an offset correction estimation of a fundamental network propagation delay using said first difference and said second difference;
  generating a recovered clock value from said receiver time clock and said offset correction estimation;
  transmitting said first packet and said second packet to said plurality of said second nodes.

12. The method of claim 11 further comprising transmitting an error correction packet constructed utilizing forward error correction or automatic repeat request or both forward error correction and automatic repeat request.

13. The method of claim 11 further comprising utilizing a linear array in said comparator.

14. The method of claim 11 further comprising utilizing an averaging filter coupled with a comparator output.

15. The method of claim 11 further comprising utilizing a ramp-rate limiter coupled with a comparator output.

16. A system for clock synchronization over packet-switched networks comprising:
  means for packetizing data into a first packet in a first node selected from a group of nodes wherein said first node is coupled with a network;
  means for packetizing data into a second packet in said first node;
  means for time stamping said first packet in said first node;
  means for time stamping said second packet in said first node;
  means for transmitting said first packet and said second packet over said network;
  means for providing software to a plurality of second nodes selected from said group of nodes wherein said plurality of second nodes are coupled with said network and wherein said plurality of second nodes are configured to generate a shortest delay offset wherein said software comprises the steps of:
  means for recovering a clock by generating a first difference between a first packet timestamp taken from said first packet and a receiver time clock and a second difference between a second packet timestamp taken from said second packet and said receiver time clock;
  said means for recovering said clock comprising utilizing a quality of service module comprising a dejitter queue;
  said means for recovering said clock comprising utilizing a shortest-delay offset generator comprising a fifo-buffer sliding window for holding said first difference and said second difference and a comparator;
  said shortest-delay offset generator utilized in calculating an offset correction estimation of a fundamental network propagation delay using said first difference and said second difference;
  means for generating a recovered clock value from said receiver time clock and said offset correction estimation;
  means for transmitting said first packet and said second packet to said plurality of said second nodes.

17. The system of claim 16 further comprising means for transmitting an error correction packet constructed utilizing forward error correction or automatic repeat request or both forward error correction and automatic repeat request.

18. The system of claim 16 further comprising means for utilizing a linear array in said comparator.

19. The system of claim 16 further comprising means for utilizing an averaging filter coupled with a comparator output.

20. The system of claim 16 further comprising means for utilizing a ramp-rate limiter coupled with a comparator output.

* * * * *